(12) United States Patent  
Takahara

(10) Patent No.: US 8,817,344 B2
(45) Date of Patent: Aug. 26, 2014

(54) SCANNER APPARATUS

(75) Inventor: Hiroyuki Takahara, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 28 days.

(21) Appl. No.: 13/418,603

(22) Filed: Mar. 13, 2012

(65) Prior Publication Data

US 2012/0236374 A1    Sep. 20, 2012

(30) Foreign Application Priority Data

Mar. 18, 2011  (JP) ................................. 2011-061085

(51) Int. Cl.
*H04N 1/04* (2006.01)

(52) U.S. Cl.
USPC ............ 358/497; 358/483; 358/474; 358/498

(58) Field of Classification Search
USPC .......................... 358/497, 483, 474, 498, 487
See application file for complete search history.

(56) References Cited

U.S. PATENT DOCUMENTS

| | | | | |
|---|---|---|---|---|
| 6,008,485 | A | * | 12/1999 | Chiang ...................... 250/208.1 |
| 6,762,864 | B2 | * | 7/2004 | Kao .............................. 358/497 |
| 2001/0043371 | A1 | | 11/2001 | Takahara |

FOREIGN PATENT DOCUMENTS

| | | |
|---|---|---|
| CN | 001432880 A | 7/2003 |
| CN | 001835541 A | 9/2006 |
| JP | H11-069106 A | 3/1999 |
| JP | 2009-253327 A | 10/2009 |

* cited by examiner

*Primary Examiner* — Houshang Safaipour
(74) *Attorney, Agent, or Firm* — Canon USA Inc IP Division

(57) ABSTRACT

A scanner apparatus includes: a holder configured to hold a line sensor unit; a first spacer and a second spacer disposed on both sides of the line sensor unit in a longitudinal direction and configured to come into contact with the transparent plate; and a biasing unit configured to press the holder toward the transparent plate between the first spacer and the second spacer in the longitudinal direction. The line sensor unit and the holder are coupled together on both sides of the biasing unit in the longitudinal direction. A force applied to the holder by the biasing unit is transmitted from the holder through two coupling portions to the line sensor unit, thereby biasing the first spacer and the second spacer to the transparent plate.

5 Claims, 8 Drawing Sheets

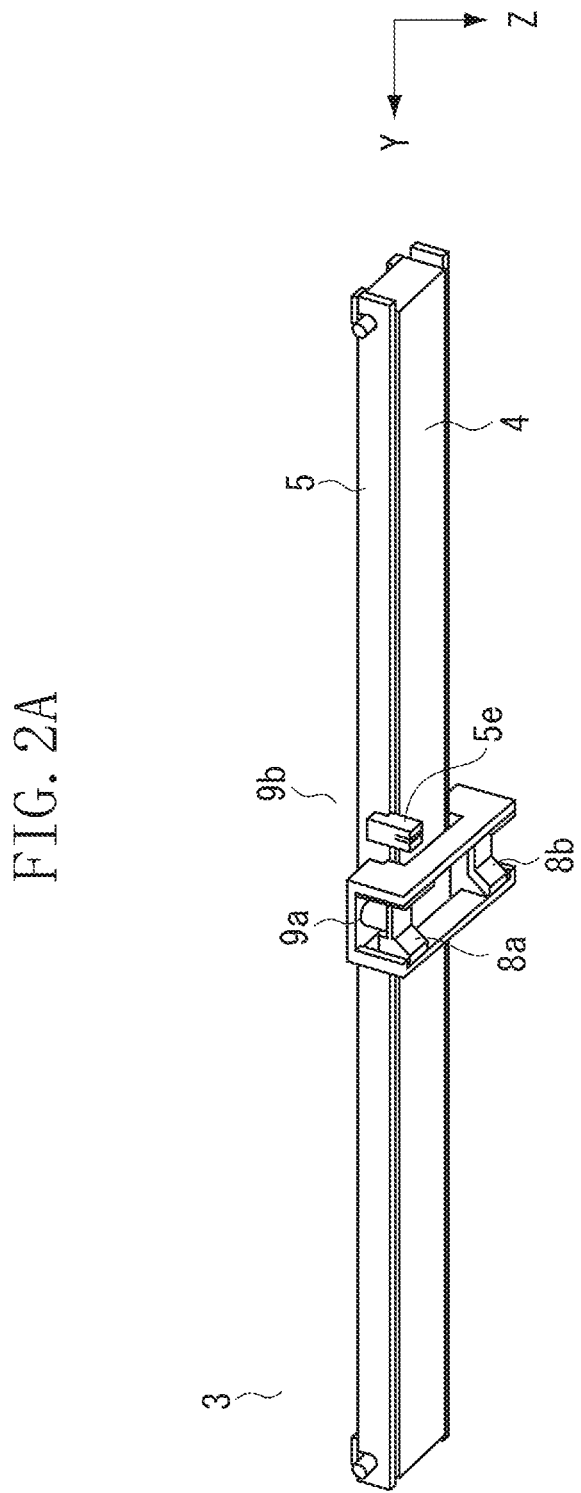

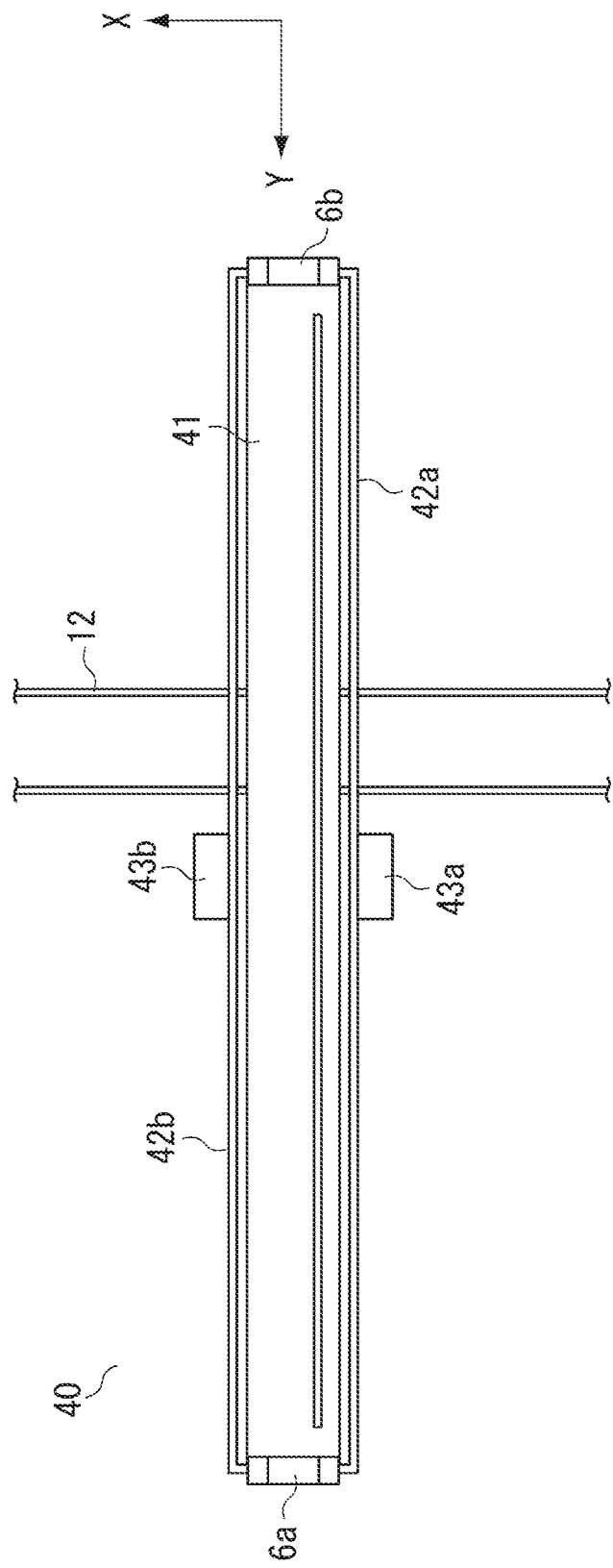

SCANNER APPARATUS

BACKGROUND OF THE INVENTION

1. Field of the Invention

The present invention relates to a scanner apparatus suitably used for an image scanner, a copying machine, a facsimile, and a multifunction peripheral.

2. Description of the Related Art

Japanese Patent Application Laid-Open No. 2009-253327 discusses a flat-bed type scanner apparatus that includes a line sensor unit (contact image sensor (CIS) unit) configured to scan and move with respect to a document placed on a platen. In this apparatus, the line sensor unit is biased to a glass plate of the platen by a coil spring. In both ends of the line sensor unit, two contact members that come into contact with the glass plate are formed. The scanning movement of the line sensor unit is accompanied by sliding of the contact members on a surface of the glass plate.

In a configuration of the scanner apparatus discussed in the Japanese Patent Application Laid-Open No. 2009-253327, a biasing force is applied to the vicinity of a center of the line sensor unit toward the glass plate. This creates a possibility that the line sensor unit may be warped with the two contact members (spacers) of both sides set as support points, and only the vicinity of the center may approach a surface of the glass plate, consequently shifting an in-focus position of a reading optical system from an upper surface of the glass plate. Then, an imaging failure (defocusing) occurs at the vicinity of the center, causing a read image to be blurred in a streaky shape.

SUMMARY OF THE INVENTION

The present invention is directed to a scanner apparatus that can provide a read image clear overall without any partial imaging failures.

According to an aspect disclosed herein, a scanner apparatus for scanning and reading a document placed on a transparent plate includes: a line sensor unit; a holder configured to hold the line sensor unit; a mechanism configured to scan the line sensor unit and the holder along a surface of the transparent plate; a first spacer and a second spacer disposed on both sides of the line sensor unit in a longitudinal direction and configured to contact the transparent plate; and a biasing unit configured to bias the holder toward the transparent plate between the first spacer and the second spacer in the longitudinal direction. The line sensor unit and the holder are coupled together on both sides of the biasing unit in the longitudinal direction.

With this configuration, a force applied to the holder by the biasing unit is transmitted from the holder through two coupling portions to the line sensor unit, thereby biasing the first spacer and the second spacer to the transparent plate.

According to the present invention, since the line sensor unit is fixed to the holder to bias the holder, the line sensor is not warped even when the holder is warped. As a result, the scanner apparatus that can provide a read image clear overall without any partial imaging failures is achieved.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate a configuration of a reading unit.

FIGS. 4A and 4B illustrate yet another configuration of a reading unit.

DESCRIPTION OF THE EMBODIMENTS

Various exemplary embodiments, features, and aspects of the invention will be described in detail below with reference to the drawings.

Figure 1A:
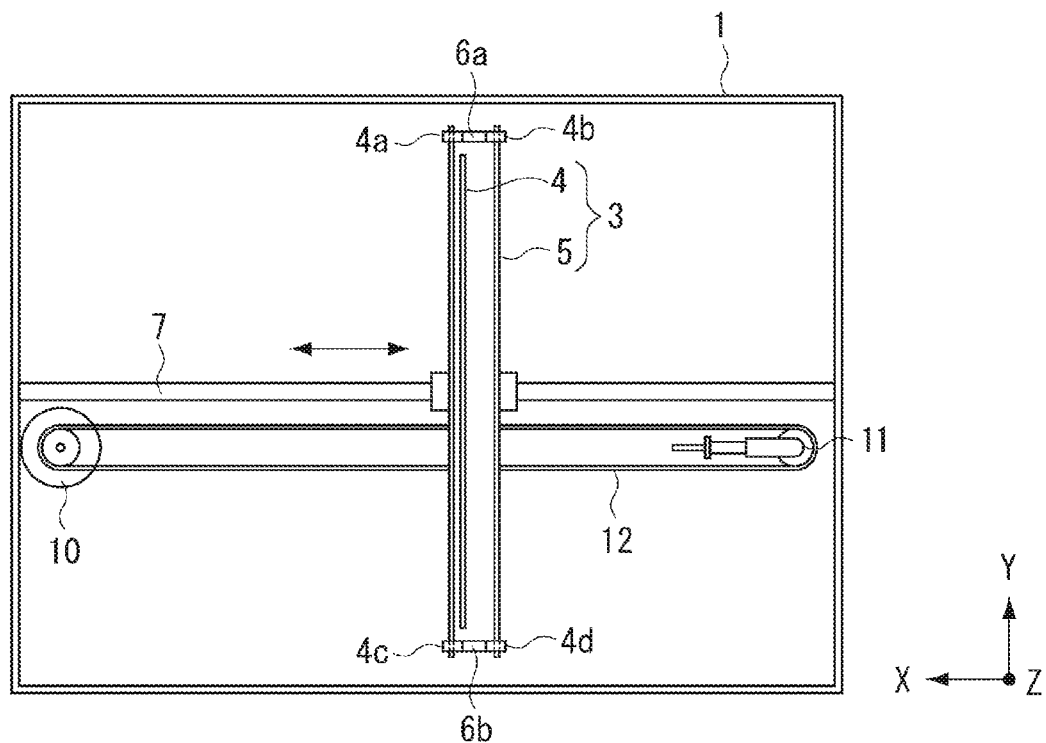
FIGS. 1A, 1B, 1C illustrate a configuration of a scanner apparatus according to an exemplary embodiment.
Figure 1B:
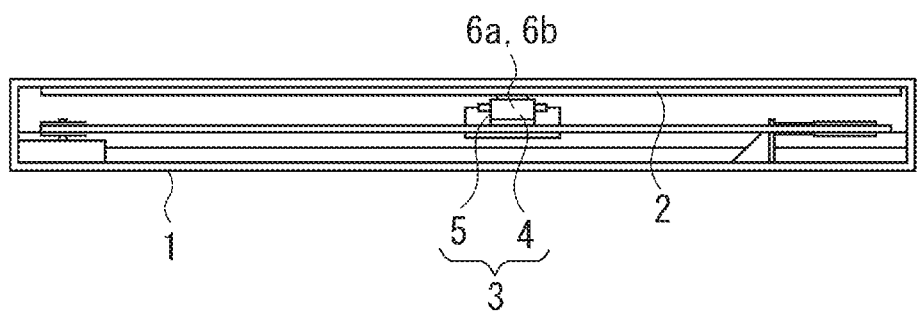
Figure 1C:
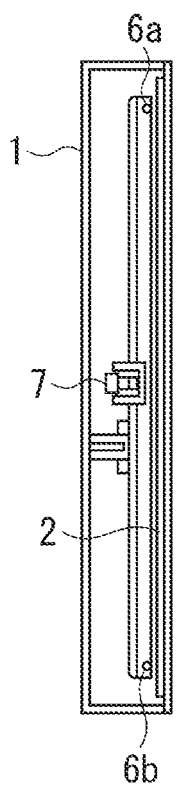
Figure 2B:
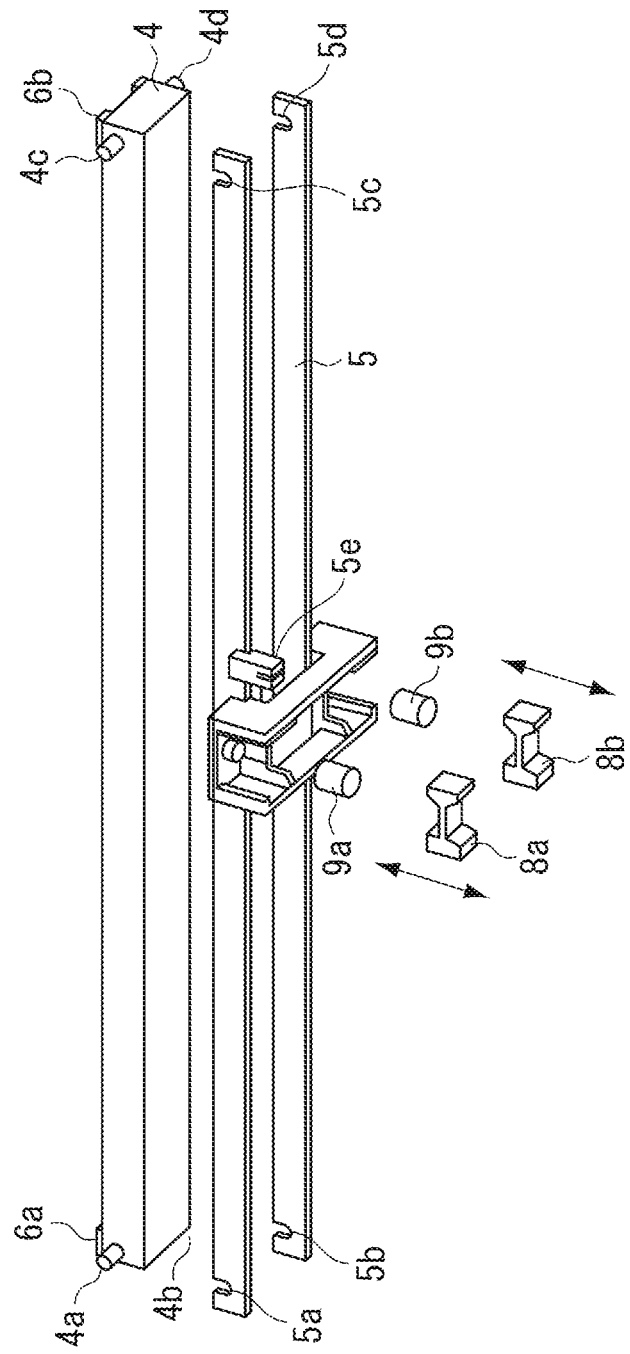

FIGS. 1A to 1C schematically illustrate an upper view, a front view, and a left side view of an overall configuration of a scanner apparatus according to an exemplary embodiment. FIGS. 2A and 2B illustrate a configuration of a reading unit: FIG. 2A being a perspective view and FIG. 2B being an exploded view.

The scanner apparatus includes a platen disposed on a frame 1. A glass transparent plate 2 having a reading surface on which a document is placed is fixed to the platen. A reading unit 3 is disposed below the transparent plate 2, which makes a scanning movement in an X direction during image reading.

The reading unit 3 includes a line sensor unit 4 configured to read an image of the document, and a holder 5 configured to hold the line sensor unit 4. As described below, the line sensor unit 4 and the holder 5 are coupled together at two coupling portions of both ends, while they are not brought into contact with each other at portions other than the coupling portions.

The scanner apparatus includes a drive mechanism for integrally scanning and moving the reading unit 3 along a surface of the transparent plate 2 in the X direction. The drive mechanism includes a drive motor 10 fixed to the frame 1, an idler pulley 11, and a belt 12. One portion of the belt 12 is fixed to a grasping member 5e formed in the holder 5. The frame 1 includes a guide 7, which includes a rail or a shaft having a guiding surface to guide the movement during the scanning of the reading unit 3. In this configuration, when the drive motor 10 is rotated, the belt 12 is rotated between the drive motor 10 and the idler pulley 11 to move the grasping member 5e straight ahead, and move the reading unit 3 straight ahead along the guide 7.

The line sensor unit 4 is a contact image sensor (CIS). The line sensor unit 4 includes a light source to linearly illuminate the document, and a refractive-index distribution lens array and a light-sensitive element array linearly arranged in the same direction, which constitute an integral unit. The light source linearly illuminates the document on the transparent plate in a Y direction, and the refractive-index distribution lens array forms an image of the illuminated area on the light-sensitive element array. Image data is acquired from a signal output of the light-sensitive element array.

Two spacers 6a and 6b that come into contact with the surface of the transparent plate 2 are formed near ends of both sides in a longitudinal direction (Y direction) on a surface of the line sensor unit 4 facing the transparent plate 2. The spacers 6a and 6b are brought into contact with the transparent plate 2, while slight gaps are formed between other portions of the line sensor unit 4 and the transparent plate 2 to prevent contact. Instead of the noncontact state, a light contact state can be set by small contact pressure where neither of a sensor surface of the line sensor unit 4 and a front surface of the transparent plate 2 is flawed. In the exemplary embodiment, the two spaces 6a and 6b are both sliders that slide in contact with a back surface of the transparent plate 2. Not limited to this, however, they can be small rotation members. Not limited to one element, the spacer 6a (first spacer) of one side can be divided into two or a plurality of elements. Even the divided spacers are referred to as a spacer because they are functionally similar to one spacer. The same applies to the spacer 6b (second spacer).

When seen from a Z direction vertical to the surface (YX surface) of the transparent plate 2, in the longitudinal direction, a biasing unit configured to bias the holder 5 toward the transparent plate 2 is formed in a position (almost center position) between the two spacers 6a and 6b. The biasing unit is disposed between the guide 7 and the holder 5. The pressing unit includes two sliding members 8a and 8b that slide in contact with the guide 7, and two elastic members 9a and 9b disposed between the sliding members and the guide 7 with elastic forces. These members are arranged in the holder 5. Coil springs can be used for the elastic members. The sliding members 8a and 8b are movable in the Z direction with respect to the holder 5 via the elastic members 9a and 9b.

As illustrated in the exploded view of FIG. 2B, the holder 5 includes two plate members arranged in the Y direction of both side surfaces of the line sensor unit 4. FIG. 2A illustrates an engaged and assembled state of the line sensor unit 4 and the holder 5. U-shaped grooves 5a, 5b, 5c, and 5d are formed near both ends of the respective plate members. Four projections 4a, 4b, 4c, and 4d formed on the side surface of the line sensor unit 4 are engaged with the four U-shapes grooves 5a to 5d respectively. Four coupling portions of the line sensor unit 4 and the holder 5 are formed near the two spacers 6a and 6b. The line sensor unit 4 and the holder 5 are not brought into contact with each other at places other than the coupling places. Similarly, the biasing unit and the line sensor unit 4 are not brought into contact with each other.

Thus, the line sensor unit 4 and the holder 5 are coupled together by the coupling portions disposed in positions different from the biasing unit in the Y direction. In the exemplary embodiment, these components are coupled together near both ends. However, the coupling portions can be set anywhere more inner side as long as their positions are different from that of the biasing unit.

A force applied to the vicinity of the center of the holder 5 by the biasing unit is transmitted from the holder 5 through the coupling portions to the line sensor unit 4, thereby biasing the two spacers 6a and 6b to the transparent plate 2. Since the holder 5 presses the line sensor unit 4 from above the spacers 6a and 6b, no moment of a force to bend the line sensor unit 4 is generated. In other words, even when the holder 5 is pressed by the pressing unit to be warped, no warping occurs at the line sensor unit 4, and hence the line sensor unit 4 faces the transparent plate 2 in an original shape. As a result, the scanner apparatus that can provide a good image without any partial imaging failures (defocusing) at the reading unit can be achieved.

Figure 3A:
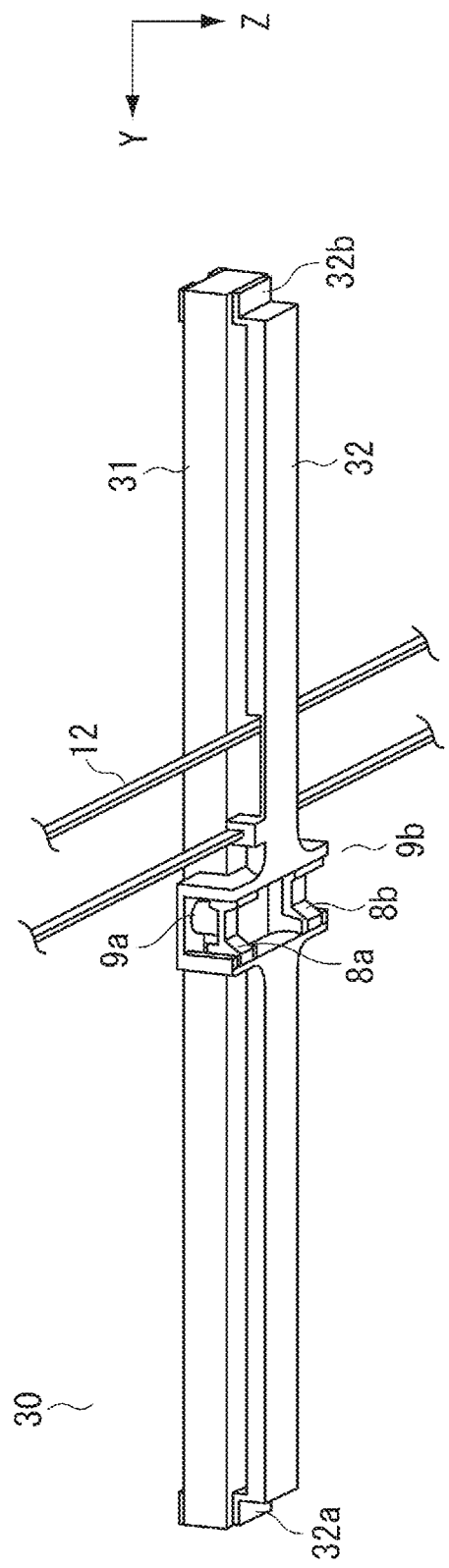
FIGS. 3A and 3B illustrate another configuration of a reading unit.
Figure 3B:
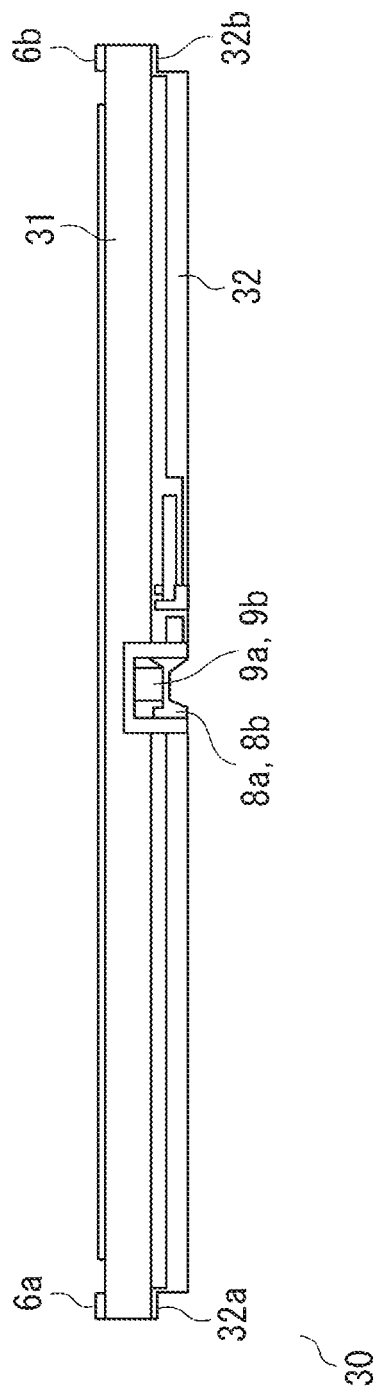

FIGS. 3A and 3B illustrate another configuration of a reading unit. The reading unit 30 is similar to that of the exemplary embodiment except a holding structure of a holder 32 for holding a line sensor unit 31. The holder 32 is coupled with the line sensor unit 31 at two places of projections 32a and 32b that are coupling portions formed near both ends. Other portions are not brought into contact with the line sensor unit 31. Similarly, a biasing unit is not brought into contact with the line sensor unit. The biasing unit presses the holder 32 by using a guide 7 as a reference.

In this configuration, a force applied to the vicinity of the center of the holder 32 by the biasing unit is transmitted through the projections 32a and 32b of both ends of the holder 32 to be applied to ends of the line sensor unit 31 from above the spacers 6a and 6b. Thus, as in the case of the exemplary embodiment, no moment of a force to bend the line sensor unit 31 is generated.

Figure 4B:
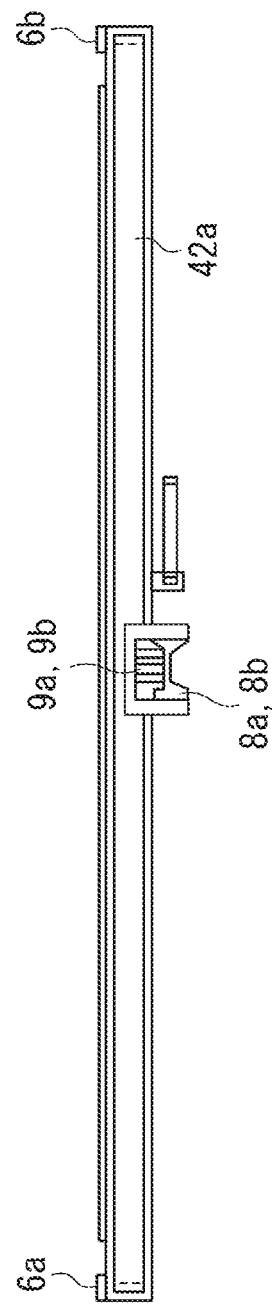

FIGS. 4A and 4B illustrate yet another configuration of a reading unit. The reading unit 40 is similar to that of the exemplary embodiment except a holding structure of a holder for holding a line sensor unit 41. The holder includes two arms 42a and 42b arranged in a Y direction of both side surfaces of the line sensor unit 41. Different from the embodiment illustrated in FIGS. 2A and 2B, the arms 42a and 42b, which are not different separable components, are integrally fixed to the line sensor unit 42 to prevent disengagement of both ends. The arms 42a and 42b are not brought into contact with the line sensor unit 41 at places other than coupling portions of both ends. To press the holder, a biasing unit 43a is formed near the vicinity of the center of the arm 42a in the Y direction, and a biasing unit 43b is formed near the vicinity of the center of the arm 42b in the Y direction. The pressing units 43a and 43b are not brought into contact with the line sensor unit 41. As in the case of the exemplary embodiment, the biasing units 43a and 43b include sliding members 8a and 8b and elastic members 9a and 9b, and press the holder by using a guide 7 fixed to a frame as a reference.

In this configuration, forces applied to the vicinities of the centers of the arms 42a and 42b as the holders in a Z direction by the pressing units 43a and 43b are transmitted through the coupling portions of both ends of the arms 42a and 42b to be applied to ends of the line sensor unit 41 from above the spacers 6a and 6b. Thus, as in the case of the exemplary embodiment, no moment of a force to bend the line sensor unit 41 is generated.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-061085 filed Mar. 18, 2011, which is hereby incorporated by reference herein in its entirety.

What is claimed is:

1. A scanner apparatus for scanning and reading a document placed on a transparent plate, comprising:
   a line sensor unit;
   a holder to hold the line sensor unit;
   a mechanism configured to scan the line sensor unit and the holder along a surface of the transparent plate;
   a first spacer and a second spacer disposed on both sides of the line sensor unit in a longitudinal direction and configured to contact the transparent plate; and
   a biasing unit configured to bias the holder toward the transparent plate at a center position between the first spacer and the second spacer in the longitudinal direction by applying a force to the holder, which presses the line sensor unit from above the first and second spacers, thereby eliminating a moment to bend the line sensor unit,
   wherein the line sensor unit and the holder are coupled together on both sides of the line sensor unit in the longitudinal direction and are not in contact with each other at the center position.

2. The scanner apparatus according to claim 1, further comprising a guide for guiding movement of the holder during the scanning, wherein a pressing unit is configured to be disposed between the guide and the holder.

3. The scanner apparatus according to claim 1, further comprising a pressing unit, comprising:
   a sliding member configured to slide in contact with the guide; and
   an elastic member provided between the sliding member and the guide with an elastic force.

4. The scanner apparatus according to claim 1, wherein the line sensor unit and the holder are configured not to contact with each other at locations other than coupling portions.

5. The scanner apparatus according to claim 1, wherein the line sensor unit and the holder are integrally formed.

* * * * *